United States Patent
Chan et al.

(10) Patent No.: US 12,045,362 B2
(45) Date of Patent: *Jul. 23, 2024

(54) SECURE COMPUTER VISION PROCESSING

(71) Applicants: ATI TECHNOLOGIES ULC, Markham (CA); ADVANCED MICRO DEVICES, INC., Santa Clara, CA (US)

(72) Inventors: Benjamin Koon Pan Chan, Markham (CA); William Lloyd Atkinson, Markham (CA); Tung Chuen Kwong, Markham (CA); Guhan Krishnan, Boxborough, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/889,956

(22) Filed: Aug. 17, 2022

(65) Prior Publication Data

US 2023/0110765 A1    Apr. 13, 2023

Related U.S. Application Data

(63) Continuation of application No. 16/228,349, filed on Dec. 20, 2018, now Pat. No. 11,443,051.

(51) Int. Cl.
*G06F 21/62* (2013.01)
*G06V 10/94* (2022.01)

(52) U.S. Cl.
CPC ........ *G06F 21/6218* (2013.01); *G06V 10/955* (2022.01)

(58) Field of Classification Search
USPC ........................................................ 726/27
See application file for complete search history.

(56) References Cited

U.S. PATENT DOCUMENTS

| | | | |
|---|---|---|---|
| 2008/0109662 A1* | 5/2008 | Natarajan | G06F 12/1408 713/193 |
| 2013/0057384 A1 | 3/2013 | Morris et al. | |
| 2013/0305342 A1* | 11/2013 | Kottilingal | H04N 21/42623 726/29 |

FOREIGN PATENT DOCUMENTS

JP        2007258957        10/2007

OTHER PUBLICATIONS

Extended European Search Report issued in European Application No. 19/899,587, mailed Aug. 8, 2022, 6 Pages.

(Continued)

*Primary Examiner* — Brandon Hoffman

(57) ABSTRACT

A computer vision processor in an image cluster defines a fenced memory region (FMR) that controls access to image data stored in a first portion of a trusted memory region (TMR). The computer vision processor receives FMR requests from an application implemented in a processing cluster. The FMR requests are to access the image data in the first portion of the TMR. The computer vision processor selectively allows the requesting application to access the image data. In some cases, the computer vision processor acquires the image data and stores the image data in the first portion of the TMR, such as buffers in the TMR. A data fabric selectively permits the image processing application to access the data stored in the TMR based on whether the image cluster has opened or closed the FMR for the portion of the TMR.

20 Claims, 3 Drawing Sheets

(56) References Cited

OTHER PUBLICATIONS

Notice of Allowance issued in Korean Application No. 10-2021-7018940, mailed Mar. 16, 2023, 4 pages.
Office Action issued in Indian Application No. 202117024948, mailed Jan. 20, 2023, 6 Pages.
Office Action issued in Japanese Application No. 2023-013741, mailed Feb. 20, 2024, 2 pages.

* cited by examiner

SECURE COMPUTER VISION PROCESSING

CROSS-REFERENCE TO RELATED APPLICATIONS

The present application is a Continuation application of U.S. patent application Ser. No. 16/228,349, now U.S. Pat. No. 11,443,051, entitled "SECURE COMPUTER VISION PROCESSING", and filed on Dec. 20, 2018, the entirety of which is incorporated by reference herein.

BACKGROUND

Computer vision allows computers to extract high-level information from digital images by automating tasks that correspond to similar tasks performed by a human visual system. Examples of computer vision tasks include object recognition, motion analysis, scene reconstruction, and image restoration. Computer vision techniques include two complementary tasks: (1) acquiring one or more digital images and (2) processing the acquired images to generate high dimensional data that represents an "understanding" of the information in the digital images. Image acquisition is performed by one or more image sensors or cameras, as well as range sensors, depth sensors, tomography devices, radar, ultrasonic cameras, and the like. The digital image can be an ordinary two-dimensional (2D) image, a three-dimensional (3D) volume, or a combination of one or more of the 2D images and 3D volumes. Image processing techniques including preprocessing the data to reduce noise or enhance image contrast, extracting features from the image data, detection or segmentation of the image data, image recognition or registration, and decision-making based on the extracted information.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In some computing architectures, separate clusters of processing elements are used to perform different computer vision tasks. An image cluster includes one or more processing elements (referred to herein as computer vision processors) that are configured to acquire the digital images for subsequent analysis. The image cluster receives data from image acquisition devices such as sensors, cameras, radar, and the like. In some cases, the computer vision processor in the image cluster performs preprocessing on the acquired data such as resampling to a predetermined coordinate system, noise reduction, contrast enhancement, or scaling of the images. The image cluster then stores the acquired or postprocessed data in a memory region. A processing cluster accesses the acquired data from the memory region, processes the acquired or postprocessed data, and stores the processing results in the memory region. The processing cluster is a user-facing cluster that also executes untrusted applications. Allowing untrusted applications to access computer vision data stored in the memory region could negatively impact user privacy. Requiring the image cluster to encrypt the data for storage in the memory region, e.g., using a private key known only by the image cluster and the computer vision application in the processing cluster, could provide privacy but this would significantly increase the processing overhead and reduce image processing throughput.

Figure 1:
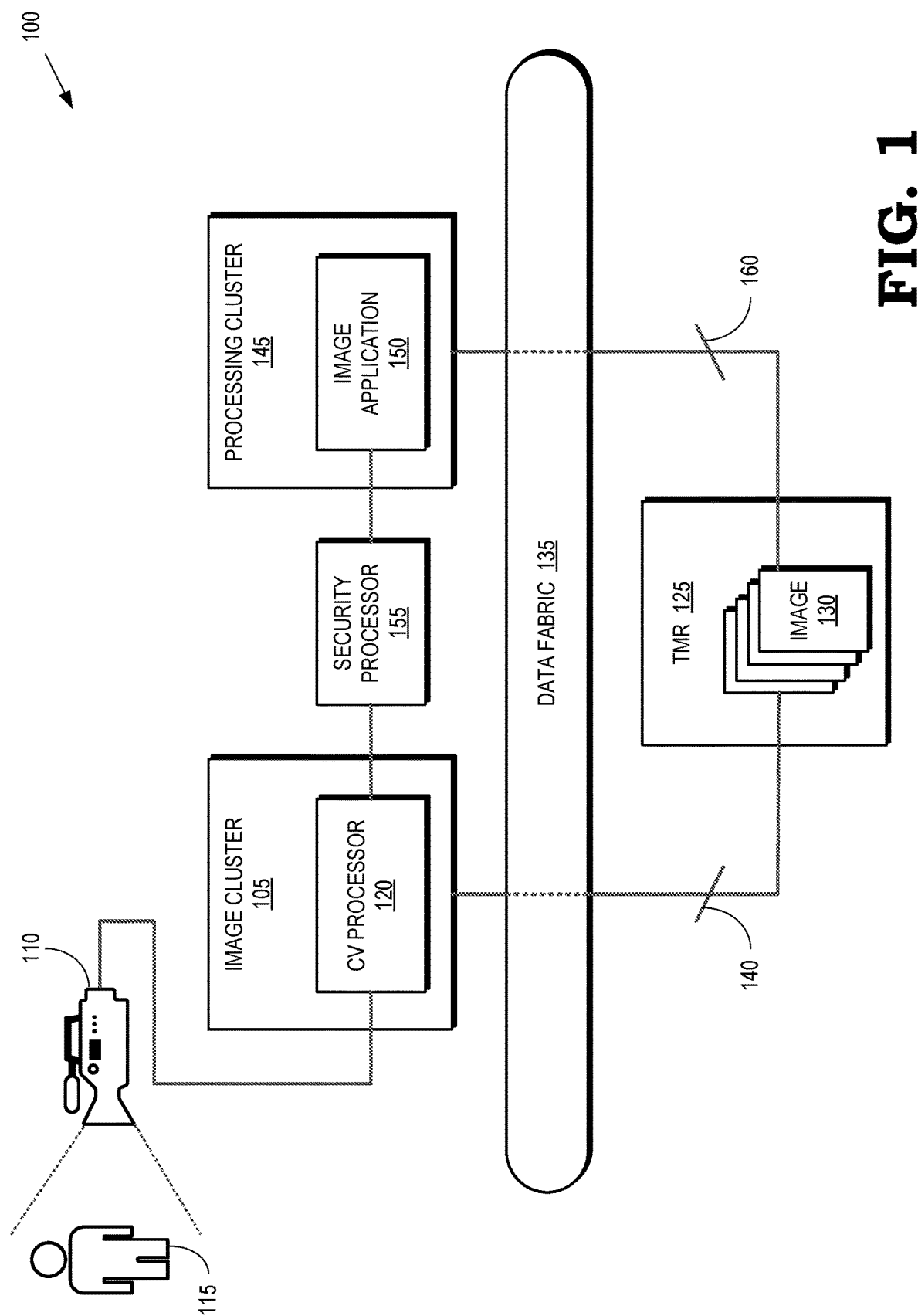
FIG. 1 is a block diagram of a processing system that supports secure computer vision processing according to some embodiments.
Figure 2:
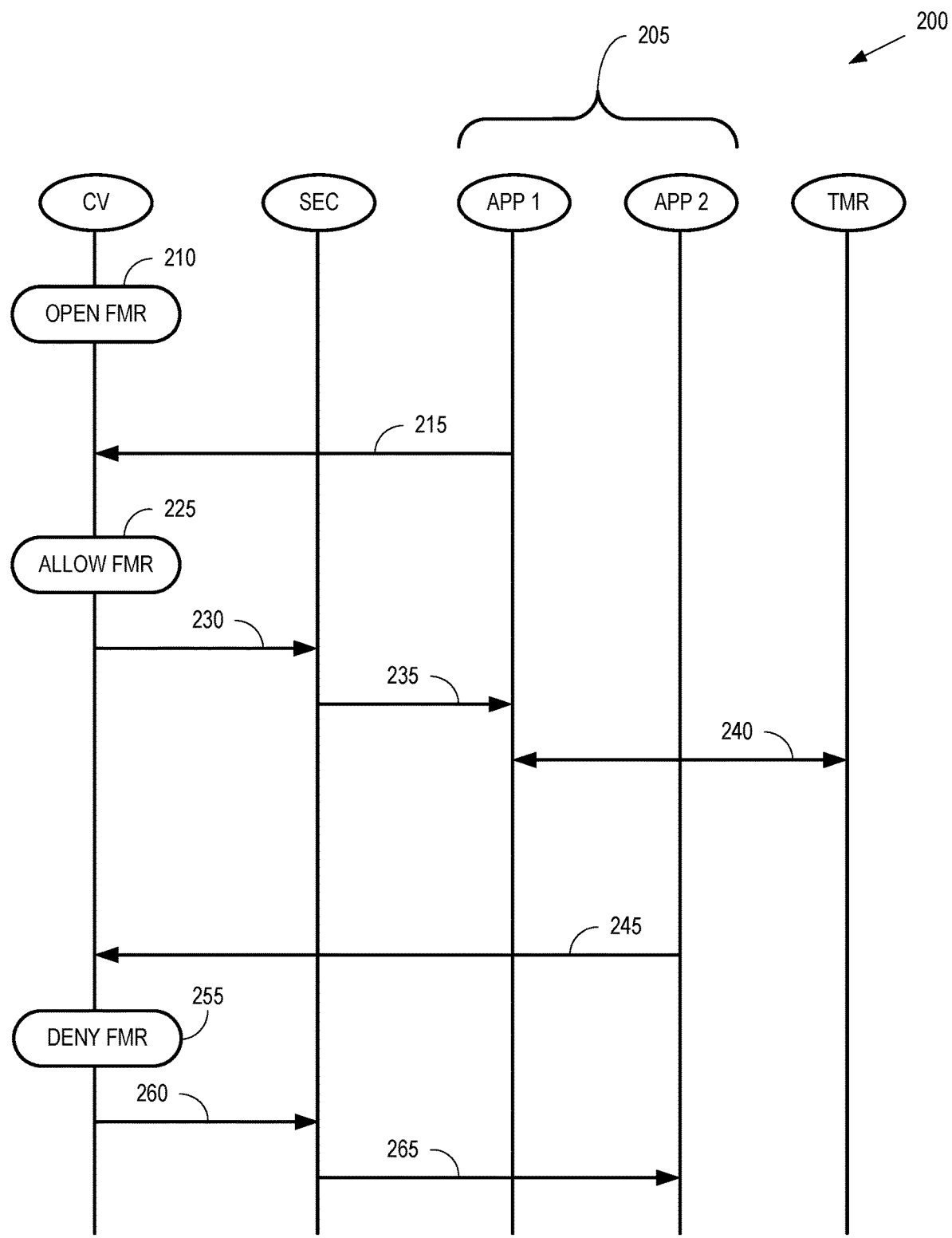
FIG. 2 is a message flow that includes messages used to selectively allow access to a trusted memory region (TMR) by untrusted applications according to some embodiments.
Figure 3:
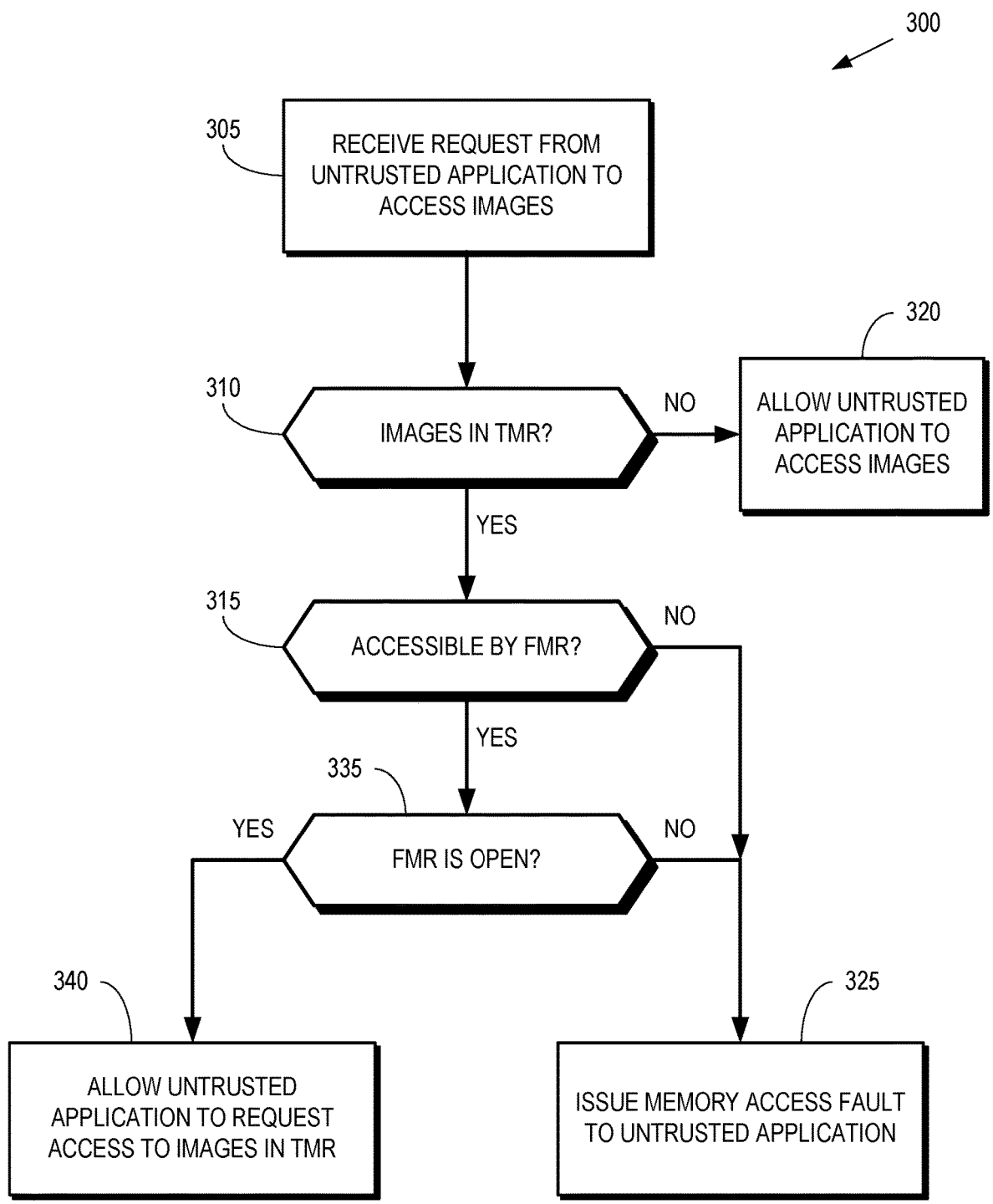
FIG. 3 is a flow diagram of a method of selectively allowing untrusted applications to request access to portions of a TMR that are controlled by a fenced memory region (FMR) according to some embodiments.

FIGS. 1-3 disclose a processing system in accordance with some embodiments that includes an image cluster and a processing cluster enforces security and privacy for computer vision data by allowing a computer vision processor in the image cluster to define a fenced memory region (FMR) that controls access to image data acquired or postprocessed by the image cluster. The computer vision processor in the image cluster stores the image data in a trusted memory region (TMR) that is accessible by trusted entities in the image cluster. The image cluster controls access to a portion of the TMR, such as a set of buffers in the TMR, that are associated with the FMR. The image cluster selectively allows the processing cluster to access information stored in the TMR in response to receiving an FMR request to access the information. Some embodiments of the image cluster receive FMR requests via a security processor, which acts as a trusted entity to control access to the image data in the TMR based on the FMR requests and responses. For example, the security processor receives an FMR request to access information in the TMR from an image processing application executing on the processing cluster and provides the request to the computer vision processor in the image cluster. The security processor grants access to the processing application if the image cluster grants the FMR request or denies access if the image cluster denies the FMR request. The image cluster only processes FMR requests if the FMR is opened by the image cluster. The security processor does not allow any untrusted application to access the TMR if image cluster closes the FMR.

A data fabric in the processing system, e.g., a memory controller and associated infrastructure, receives requests from the image processing application to access or store image data. The data fabric determines whether the locations indicated in the request are in buffers of the TMR that are accessible via FMR requests defined by the image cluster. If so and the image cluster has opened the FMR, the image processing application is permitted to send FMR requests to access the image data from the buffer or store the image data in the buffer. The image processing application is then able to access the image data if the image cluster grants the FMR request. If the memory request is to a portion of the TMR that is not accessible via FMR requests, or if the image cluster has closed the FMR, the data fabric issues a memory access fault and the image processing application is not permitted to access or store the image data in the TMR. Other applications executing on the processing cluster are not permitted to access buffers in the TMR that are controlled by the FMR if the image cluster has closed the FMR. Some embodiments of the computer vision processor toggle the FMR policy, e.g., in response to user input. For example, if the user consents to recording of the image data, the computer vision processor toggles the FMR policy to allow the processing cluster to access and store image data outside the buffers in the TMR that are controlled by the FMR policy.

FIG. 1 is a block diagram of a processing system 100 that supports secure computer vision processing according to some embodiments. The processing system 100 includes an image cluster 105 that gathers, collects, or receives data from image acquisition devices such as a video camera 110. Some embodiments of the image cluster 105 gather, collect, or receive data from other sources such as sensors, cameras, radar, and the like. The video camera 110 records images such as a video of a user 115 that is in the field-of-view of the video camera 110. Information representative of the images, such as a stream of bits or frames, is generated in the video camera 110 and provided to the image cluster 105. In the illustrated embodiment, the image cluster 105 includes one or more processing elements such as the computer vision processor 120. A single computer vision processor 120 is shown in FIG. 1, although some embodiments of the image cluster 105 include more than one processing element that gathers, collects, or receives data from additional image or video sources.

The image cluster 105 stores the acquired data in a memory region 125 that has a trusted relationship with the image cluster 105. The memory region 125 is therefore referred to as a trusted memory region (TMR) 125. The trust relationship is established between the image cluster 105 and the TMR 125 using techniques such as handshaking protocols, authentication protocols, key exchange, hardware isolation, and the like. For example, the computer vision processor 120 stores information representing the image in a buffer 130 of the TMR 125, which also includes additional buffers for storing other images or data. Some embodiments of the computer vision processor 120 in the image cluster 105 perform preprocessing on the acquired data such as resampling to a predetermined coordinate system, noise reduction, contrast enhancement, scaling of the images, and the like. The postprocessed image data is then stored in the buffer 130 of the TMR 125. The image data stored in the buffer 130 is considered secure because of the trusted relationship between the image cluster 105 and the TMR 125. The security and privacy of the user 115 is therefore protected by the trusted relationship between the image cluster 105 and the TMR 125. However, not all entities in the processing system 100 have a trusted relationship with the TMR 125.

The image cluster 105 exchanges information with the TMR 125 via a data fabric 135 implemented in the processing system 100. Some embodiments of the data fabric 135 include a memory controller and associated infrastructure to support an interface 140 between the image cluster 105 and the TMR 125. The associated infrastructure can include one or more buses, bridges, switches, routers, wires, traces, and the like. The interface 140 provides secure communication between the image cluster 105 and the TMR 125 due to the trusted relationship between these entities. For example, the data fabric 135 or the interface 140 can receive requests from the computer vision processor 120 to store information in the TMR 125. The data fabric 135 or the interface 140 verifies that the computer vision processor 120 is authorized to access the TMR 125 (e.g., using a key or password) and therefore provides the computer vision processor 120 with access to the TMR 125. Memory access requests from entities that are not authorized to access the TMR 125 are denied or rejected. For example, the data fabric 135 can issue a memory access fault in response to an access request from an unauthorized entity.

The processing system 100 includes a processing cluster 145 that executes applications such as the image processing application 150. The processing cluster 145 does not have a trusted relationship with the TMR 125. The image processing application 150 is therefore referred to as an untrusted application. Allowing untrusted applications to access computer vision data stored in the TMR 125 could negatively impact user privacy. However, preventing all untrusted applications from accessing data stored in the TMR 125, such as the images in the buffer 130, would severely limit the ability of the processing system 100 to utilize the image data stored in the TMR 125. Some embodiments of the image processing application 150 are executed in the processing cluster 145 to extract high-level information from the images in the buffer 130 by automating tasks such as object recognition, motion analysis, scene reconstruction, and image restoration. Denying the image processing application 150 access to the images in the buffer 135 would therefore limit the ability of the processing system 100 to process the images to generate high dimensional data that represents an "understanding" of the information in the images acquired by the image cluster 105.

In order to ensure the privacy and security of the user 115 while also allowing the processing cluster 145 to perform valuable operations on data stored in the TMR 125, the image cluster 105 selectively provides access to the TMR 125 by defining a fenced memory region (FMR) associated with a portion of the TMR 125. In the illustrated embodiment, the FMR defined by the image cluster 105 includes the buffers 130 that store the images acquired (and in some cases preprocessed) by the computer vision processor 120.

The image cluster 105 uses the FMR to control access to the image data stored in the portion of the TMR 125 that is associated with the FMR. Some embodiments of the computer vision processor 120 receive FMR requests from applications executing in the processing cluster 145 such as the image processing application 150. The FMR requests include requests to access image data in the buffers 130 in the TMR 125. For example, the FMR request can include information such as an address indicating a location in the TMR 125. The computer vision processor 120 uses the address to determine that the FMR request is attempting to access the buffers 130 that are controlled by the FMR. The computer vision processor 120 selectively allows the image processing application 150 to access the image data in the buffer 130, e.g., depending on whether the image cluster 105 or the computer vision processor 120 has opened or closed the FMR. Some embodiments of the image cluster 105 store (or have access to) a white list that indicates applications that should be given access to the buffers 130. The image cluster 105 can also provide access to the buffers 130 in response to the user 115 authorizing access or providing an indication that the images in the buffer is 130 can be made publicly available.

Some embodiments of the processing system 100 include a security processor 155 that is a trusted entity. The security processor 155 controls access to the buffers 130 in the TMR 125 based on FMR requests generated by the processing cluster 145 and FMR responses provided by the image cluster 105. For example, the image cluster 105 can inform the security processor 155 that the image cluster 105 has opened the FMR. If the security processor 155 receives an FMR request to access information in the TMR 125 from the image processing application 150 while the FMR is open, the security processor 155 provides the FMR request to the image cluster 105, e.g., to the computer vision processor 120. In response to receiving the FMR request, the image cluster 105 selectively allows access to the TMR as indicated in an FMR response provided to the security processor 155. The security processor 155 grants access to the image processing application 150 if the image cluster 105 grants the FMR request or denies access if the image cluster 105 denies the FMR request. The image cluster 105 only processes FMR requests if the FMR is opened by the image cluster 105. The security processor 155 does not allow any untrusted application to access the TMR 125 if the image cluster 105 closes the FMR.

The data fabric 135 supports an interface 160 between the processing cluster 145 and the TMR 125. Some embodiments of the data fabric 135 selectively allow the processing cluster 145 (or the image processing application 150) to request access to portions of the TMR 125 based on the memory access request generated by the processing cluster 145 or the image processing application 150. The data fabric 135 determines whether the locations indicated in the request are in the buffer 130 of the TMR 125 that is accessible via FMR requests, as defined by the image cluster 105. If so and the image cluster 105 has opened the FMR, the processing cluster 145 or the image processing application 150 is permitted to send FMR requests to access the image data from the buffer 130 or store the image data in the buffer 130. The processing cluster 145 or the image processing application 150 is then able to access the image data if the image cluster 105 grants the FMR request. The data fabric 135 issues a memory access fault if the memory request is to a portion of the TMR 125 that is not accessible via FMR requests, or if the image cluster 105 has closed the FMR. In that case, the processing cluster 145 or the image processing application 150 is not permitted to access or store the image data in the TMR 125. Other applications executing on the processing cluster 145 are not permitted to access the buffer 130 in the TMR 125 that is controlled by the FMR if the image cluster 105 has closed the FMR.

The policy that controls access to the TMR 125 based on the FMR is modified based on user input in some cases. For example, the user 115 can make the image data in the buffer 130 publicly available by providing consent to an operator of the processing system 100. Some embodiments of image processor 105 or the computer vision processor 120 toggle the FMR policy in response to user input. For example, if the user consents to recording of the image data, the computer vision processor 120 toggles the FMR policy to allow the processing cluster 145 to access and store image data outside the buffers 130 in the TMR 125 that are controlled by the FMR policy.

FIG. 2 is a message flow 200 that includes messages used to selectively allow access to a trusted memory region (TMR) by untrusted applications according to some embodiments. The message flow 200 includes messages exchanged between a computer vision processor (CV) in an image cluster, a secure processor (SEC), a processing cluster 205 that includes two applications (APP1, APP2), and the TMR, which has a trusted relationship with the image cluster. The message flow 200 is therefore implemented in some embodiments of the processing system 100 shown in FIG. 1. The image cluster has defined an FMR associated with a portion of the TMR, such as a set of buffers implemented in the TMR.

At block 210, the computer vision processor in the image cluster opens the FMR to allow untrusted applications to request access to the portion of the TMR controlled by the FMR. Although not shown in FIG. 2 in the interest of clarity, the computer vision processor notifies the secure processor and a data fabric such as the data fabric 135 shown in FIG. 1 that the image cluster has opened the FMR.

The first application (APP1) transmits an FMR request 215 to the computer vision processor to request access to the FMR-controlled portion of the TMR. The FMR request includes information identifying the location of the requested portion of the TMR. In response to receiving the FMR request 215, the computer vision processor determines whether to grant the first application access to the buffers of the TMR. In the illustrated embodiment, the computer vision processor grants access to the first application at block 225. For example, the first application can be on a white list of applications that are granted access to the TMR. The computer vision processor returns an FMR response 230 to the secure processor that indicates that the computer vision processor has granted access to the first application. The secure processor forwards the FMR response 235 to the first application. In response to receiving the FMR response 235, the first application accesses the region in the TMR, e.g., over an interface supported by the data fabric, as indicated by the double-headed arrow 240.

The second application (APP2) transmits an FMR request 245 to the computer vision processor to request access to the FMR-controlled portion of the TMR. The FMR request includes information identifying the location of the requested portion of the TMR. In response to receiving the FMR request 245, the computer vision processor determines whether to grant the second application access to the buffers of the TMR. In the illustrated embodiment, the computer vision processor denies access to the second application at block 255. For example, the second application can be on a black list of applications that are not granted access to the TMR or the second application may not be on a white list of applications that are granted access to the TMR. The computer vision processor returns an FMR response 260 that indicates that the request is denied. The secure processor forwards the FMR response 265 to the second application to inform the second application that the request was denied. No interface is established between the second application and the TMR, thereby securing the information stored in the TMR from undesired or malicious access by the second application.

FIG. 3 is a flow diagram of a method 300 of selectively allowing untrusted applications to request access to portions of a TMR that are controlled by a fenced memory region (FMR) according to some embodiments. The method 300 is implemented in some embodiments of the data fabric 135 in the processing system 100 shown in FIG. 1.

At block 305, the data fabric receives a request from an untrusted application in a processing cluster to access images collected by an image cluster that has a trusted relationship with a TMR. For example, an image processing application in the processing cluster can transmit a memory access request including information indicating an address in memory that the image processing application would like to access.

At block 310, the data fabric determines whether the requested images are in the TMR. In some embodiments, the data fabric compares an address in the memory access request to an address range that corresponds to locations within the TMR. If the requested images are in the TMR, e.g., as indicated by the address being within the address range corresponding to the TMR, the method 300 flows to decision block 315. If the requested images are not in the TMR, e.g., as indicated by the address being outside the address range corresponding to the TMR, the method 300 flows to block 320 and the data fabric allows the untrusted application to request or receive access to the images.

At decision block 315, the data fabric determines whether the memory access request is directed to a portion of the TMR that is controlled by an FMR defined by the image cluster. If the memory access request from the image processing application is directed to a portion of the TMR that is not controlled by an FMR, the data fabric denies the memory access request because the image processing application is executing on the processing cluster, which does not have a trusted relationship with the TMR. The method 300 flows to block 325 and the data fabric issues a memory access fault to the untrusted image processing application. If the memory access request is directed to a portion of the TMR that is controlled by an FMR, the method 300 flows to decision block 330.

At decision block 335, the data fabric determines whether the image cluster (or computer vision processor) has opened the FMR to receive FMR requests to access the portion of the TMR that is controlled by the FMR. If not, the method 300 flows to block 325 and the data fabric issues a memory access fault to the untrusted image processing application. If the FMR is open, the method 300 flows to block 340 and the data fabric allows the untrusted image processing application to request access to the images in the portion of the TMR that is controlled by the FMR. The image processing application can therefore transmit FMR requests to the image cluster via the data fabric.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processing system comprising:
    a processing cluster configured to execute an untrusted application; and
    one or more processing elements configured to:
        define a fenced memory region (FMR) controlling access to image data stored in a trusted memory region (TMR); and
        in response to receiving an FMR request to access the image data from the untrusted application, allowing the untrusted application to access the image data when the FMR is open.

2. The processing system of claim 1, wherein the one or more processing elements are configured to:
    acquire the image data; and
    store the image data in the TMR.

3. The processing system of claim 1, wherein the one or more processing elements are configured to:
    define a set of buffers in the TMR that store the image data.

4. The processing system of claim 1, further comprising:
    a security processor having a trusted relationship with the one or more processing elements,
    wherein the one or more processing elements are configured to provide information to the security processor that indicates that the FMR is open and receive the FMR request from the security processor while the FMR is open.

5. The processing system of claim 4, wherein the one or more processing elements are configured to:
    deny the untrusted application access to the image data while the FMR is closed.

6. The processing system of claim 5, wherein the one or more processing elements are configured to:

provide information to the security processor indicating that the FMR is closed, wherein the security processor is configured to not forward FMR requests to the one or more processing elements while the FMR is closed.

7. The processing system of claim 1, wherein the one or more processing elements are configured to:
set the FMR as open or closed in response to user input.

8. An image cluster comprising:
one or more processing elements configured to:
receive, a request to access image data stored in a trusted memory region (TMR) from an untrusted application implemented in a processing cluster; and
permit the untrusted application to access the image data when a fenced memory region (FMR) controlling access to the image data in the TMR is open.

9. The image cluster of claim 8, wherein the one or more processing elements are configured to:
acquire the image data; and
store the image data in the TMR.

10. The image cluster of claim 8, wherein the one or more processing elements are configured to:
define a set of buffers in the TMR to store the image data; and
define the FMR to control access to the set of buffers in the TMR.

11. The image cluster of claim 8, wherein the one or more processing elements are configured to:
provide information that indicates that the FMR is open to a security processor having a trusted relationship with the image cluster; and
receive the request to access the image data stored in the TMR from the security processor while the FMR is open.

12. The image cluster of claim 11, wherein the security processor is configured to not forward the request to access the image data stored in the TMR while the FMR is closed.

13. The image cluster of claim 8, wherein the one or more processing elements are configured to:
close the FMR; and
deny the untrusted application access to the image data while the FMR is closed.

14. The image cluster of claim 8, wherein the one or more processing elements are configured to:
set the FMR as open or closed in response to user input.

15. A processing system, comprising:
an image cluster;
a processing cluster configured to implement an untrusted application; and
a data fabric configured to communicatively couple at least a portion of the image cluster with at least a portion of the processing cluster, wherein the data fabric is further configured to:
receive a request to access image data stored in a portion of a trusted memory region (TMR) from the untrusted application implemented in the processing cluster; and
in response to a fenced memory region (FMR) for the portion of the TMR being open, permit the untrusted application to request access to the image data stored in the portion of the TMR from the image cluster.

16. The processing system of claim 15, wherein the image cluster is configured to define the FMR to control access to the image data stored in the portion of the TMR.

17. The processing system of claim 15, wherein the data fabric is configured to, in response to the FMR for the portion of the TMR being closed, deny the untrusted application from requesting access to the image data stored in the portion of the TMR from the image cluster.

18. The processing system of claim 17, wherein the data fabric is configured to issue a memory access fault to the untrusted application implemented in the processing cluster when the FMR is closed.

19. The processing system of claim 15, wherein the image cluster is configured to:
in response to receiving the request to access image data from the untrusted application, permit the untrusted application to access the image data when the FMR is open.

20. The processing system of claim 15, wherein the image cluster is configured to:
open the FMR; and
provide information that indicates that the FMR is open to the data fabric.

* * * * *